United States Patent
White (10) Patent No.: US 8,095,717 B1
(45) Date of Patent: Jan. 10, 2012

(54) SYSTEM AND METHOD FOR CONFIGURATION REGISTER SYNCHRONIZATION

(75) Inventor: Theodore C. White, Rancho Santa Margarita, CA (US)

(73) Assignee: Marvell International Ltd., Hamilton (BM)

( * ) Notice: Subject to any disclaimer, the term of this patent is extended or adjusted under 35 U.S.C. 154(b) by 621 days.

(21) Appl. No.: 12/250,895

(22) Filed: Oct. 14, 2008

Related U.S. Application Data (60) Provisional application No. 60/980,613, filed on Oct. 17, 2007.

(51) Int. Cl.
G06F 13/36 (2006.01)
G06F 1/12 (2006.01)
G06F 13/42 (2006.01)
H04L 7/00 (2006.01)

(52) U.S. Cl. ......... 710/306; 710/310; 710/311; 713/400

(58) Field of Classification Search .......... 710/305, 710/306, 310, 311, 313, 315; 713/375, 400, 713/503
See application file for complete search history.

(56) References Cited

U.S. PATENT DOCUMENTS

| 5,619,681 | A | * | 4/1997 | Benhamida et al. | 703/23 |
| 6,055,597 | A | * | 4/2000 | Houg | 710/307 |
| 7,224,638 | B1 | * | 5/2007 | Risk et al. | 365/189.17 |
| 2006/0098770 | A1 | * | 5/2006 | Harper et al. | 375/356 |
| 2006/0190757 | A1 | * | 8/2006 | Wickeraad | 713/600 |
| 2007/0230509 | A1 | * | 10/2007 | To et al. | 370/503 |

* cited by examiner

Primary Examiner — Thomas J Cleary (57) ABSTRACT

A system includes a data holding module that at least one of stores and receives data based on a first clock signal of a first clock domain. A data output module receives the data from the data holding module and selectively outputs the data based on a load signal and a second clock signal of a second clock domain which is asynchronous to the first clock domain. A synchronization process module generates the load signal based on a state of the data output module.

20 Claims, 11 Drawing Sheets

SYSTEM AND METHOD FOR CONFIGURATION REGISTER SYNCHRONIZATION

CROSS-REFERENCE TO RELATED APPLICATIONS

This application claims the benefit of U.S. Provisional Application No. 60/980,613, filed on Oct. 17, 2007. The disclosure of the above application is incorporated herein by reference in its entirety.

FIELD

The present disclosure relates to digital circuits, and more particularly to synchronization of multiple-bit signals across asynchronous clock domains.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Multiple asynchronous clocks are used in a wide variety of hardware designs. For example, asynchronous clocks may be used in a system-on-a-chip (SOC). An SOC is a chip including hardware and electronic circuitry for a system. For example, an SOC may include on-chip memory (RAM and/or ROM), a microprocessor, peripheral interfaces, I/O logic control, data converters, and/or other components.

Asynchronous clocks may be used advantageously in SOCs to support multiple bus systems. For example, asynchronous clocks may be used to support an advanced RISC (reduced instruction set computer) machine (ARM) processor, a Peripheral Serial Bus (PCI), and a Universal Serial Bus (USB). Furthermore, asynchronous clocks may be used in large size SOCs that cannot use a single "fast" clock (i.e. synchronous clock) due to transmission delays.

In systems that include more than one clock signal, logic components that are clocked by each clock signal are referred to as clock domains. Logic within a clock domain may be verified using the same technique as for a single clock signal. In other words, a clock domain includes all logic that operates synchronously on one clock signal, even though the logic may have multiple clock signal sources.

A synchronous clock domain is aligned at a clock edge. Setup and hold times of logic components within the clock domain may be verified by comparing the clock delay to delays of signals propagating from one flip-flop to another flip-flop. For example, if the clock delay is the same for two flip-flops (i.e. A and B), configured such that the output of A is the input of B, then the delay of A's output to B's input (i.e. the A-B delay) must be greater than or equal to B's input hold time requirements and less than or equal to B's input setup time requirement.

However, if the clock delay to A and to B is not the same, there is "clock skew" present. Clock skew may be considered when verifying setup and hold times. For example, if the clock skew in the above example is 100 ps (i.e. the clock delay to B is 100 ps longer than to A), then the A-B delay may need to be 100 ps longer in order to avoid violating B's input setup time requirement. Similarly, A's output delay could be 100 ps longer and still make the input setup time of flop B compared to if there were no clock skew.

If logic is not verified, errors such as incorrect outputs may occur. The errors may propagate and cause a chip failure. For example, an asynchronous clock may cause a flip-flop or other device in the second clock domain to experience metastability. Metastability is an undesirable state where the device may hold an incorrect value. In other words, metastability may cause the value of a flip-flop to take many times longer than normal to settle into a correct state, or to oscillate several times between states before settling into one state (i.e. stabilize). Furthermore, metastability may propagate from one device to another device causing a chain of devices to experience metastability.

In asynchronous clock domain crossings (CDCs), the above verification technique may not be used. CDC occurs when an output of one flip-flop has a logical (i.e. combinatorial) path to an input of another flip-flop in a different clock domain. However, a circuit may be employed to communicate between the logic in different clock domains. The technique is called synchronization, and the logic that implements synchronization is called a synchronizer. Synchronizers prevent input setup and hold times of flip-flops and other devices from being violated outside the synchronizer logic. However, synchronizers are usually unable to tolerate setup and/or hold violations.

Figure 1A:
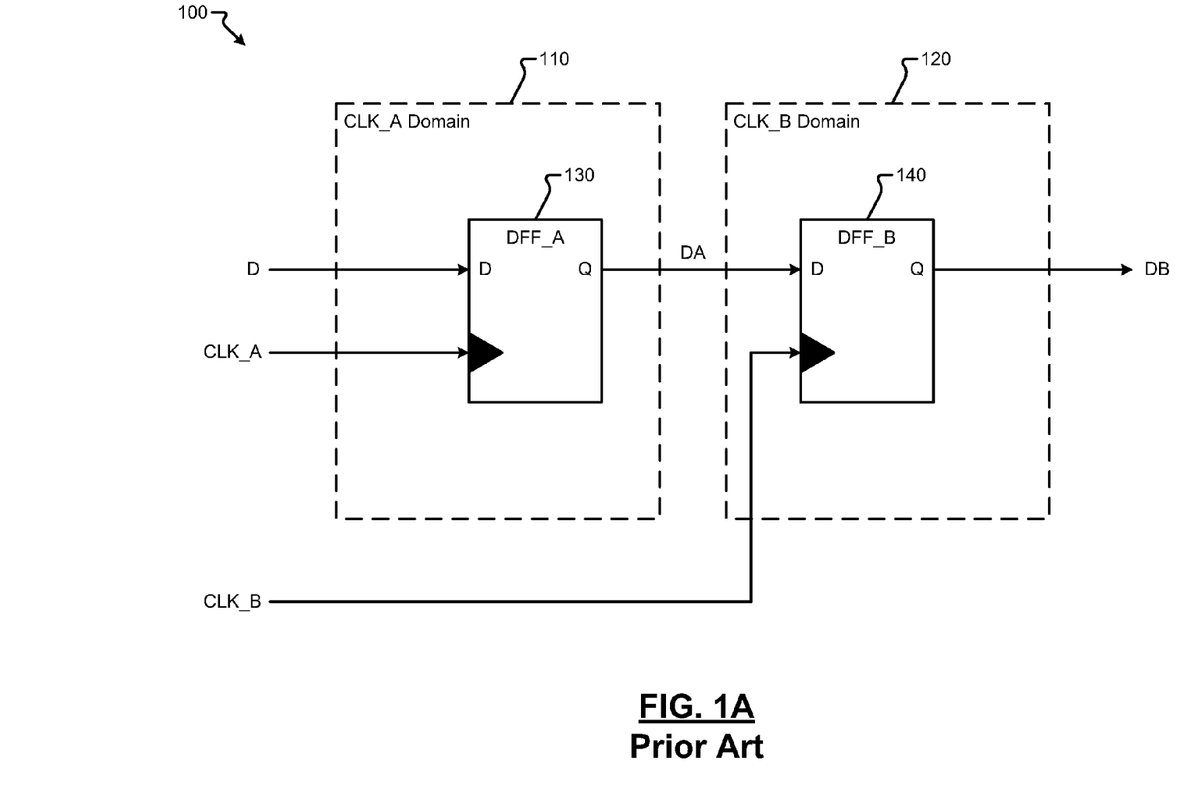
FIG. 1A is a schematic of an exemplary hardware system illustrating clock domain crossing (CDC) between two asynchronous clock domains.

Referring now to FIG. 1A, an exemplary hardware design 100 where metastability may occur due clock domain crossing (CDC) is shown. CLK_A Domain 110 is driven by CLK_A and CLK_B Domain 120 is driven by CLK_B. For example, CLK_A and CLK_B may be driven by different oscillators. Devices in each clock domain are driven by their respective clocks. For example, D-flip-flops DFF_A 130 and DFF_B 140 are driven by CLK_A and CLK_B, respectively. DFF_A 130 stores signal D when triggered at a rising edge of CLK_A. The output of DFF_A 130, signal DA, is stored in DFF_B 140 at a rising edge of CLK_B. DFF_B 140 produces an output signal DB.

Figure 1B:
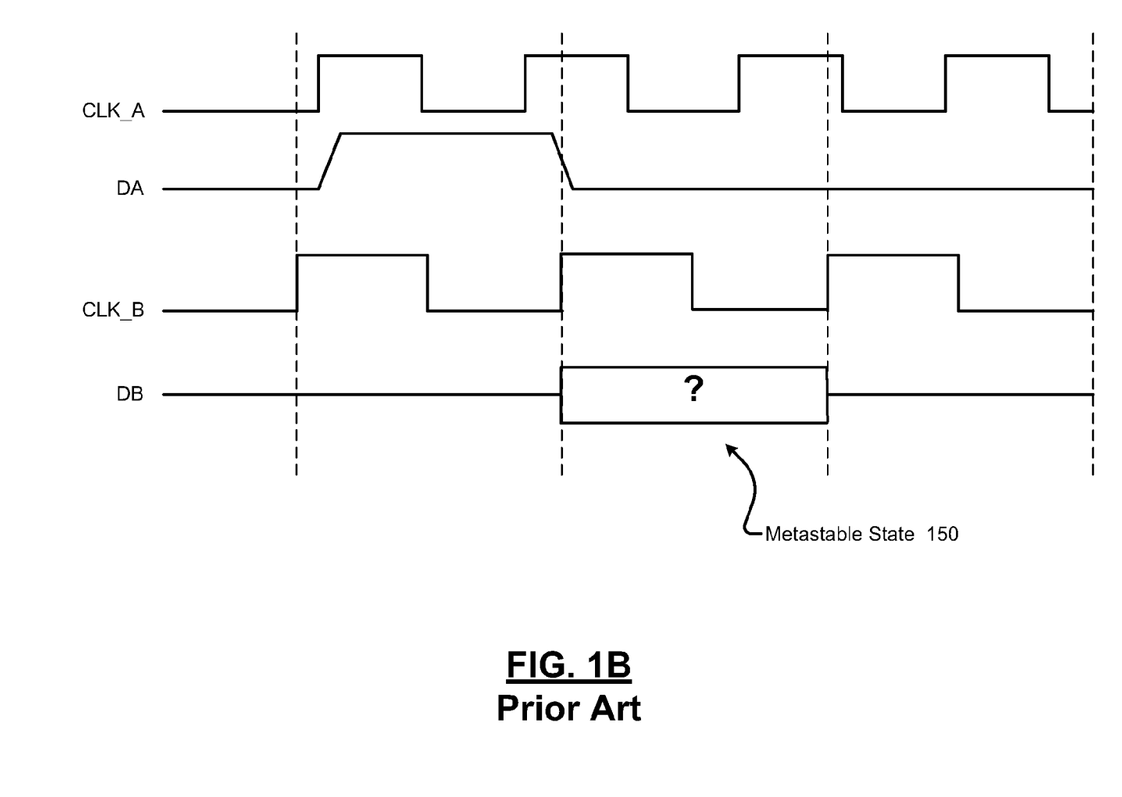
FIG. 1B is an exemplary timing diagram illustrating metastability in the hardware system of FIG. 1A.

Referring now to FIG. 1B, an exemplary timing diagram that corresponds to the exemplary hardware design 100 of FIG. 1A is shown. The timing diagram illustrates metastability resulting from clock domain crossing (CDC). The rising edge of CLK_B occurs during a transition of signal DA. In such a case, DFF_B 140 samples signal DA in an intermediate state (i.e. when DA is between high and low states). Consequently, setup time and hold time requirements of DFF_B 140 may be violated. The violation may cause DFF_B 140 to become metastable, as shown by a metastable region 150 of signal DB, where the value of signal DB may be uncertain. As previously mentioned, uncertainty (i.e. metastability) is highly undesirable in a hardware design.

To avoid metastability while still allowing signals to be passed between different clock domains, synchronizers may be used to connect the clock domains. Synchronizers may be either single-bit synchronizers or multiple-bit (i.e. bus) synchronizers. For example, single-bit synchronizers may include two D-flip-flop (2DFF) synchronizers and pulse synchronizers. For example, multiple-bit synchronizers may include multiple 2DFF synchronizers, multiplexer (MUX) control synchronizers, handshake synchronizers, and first-in-first-out (FIFO) synchronizers. Of these, the most commonly used synchronizer design is the 2DFF synchronizer.

Figure 2:
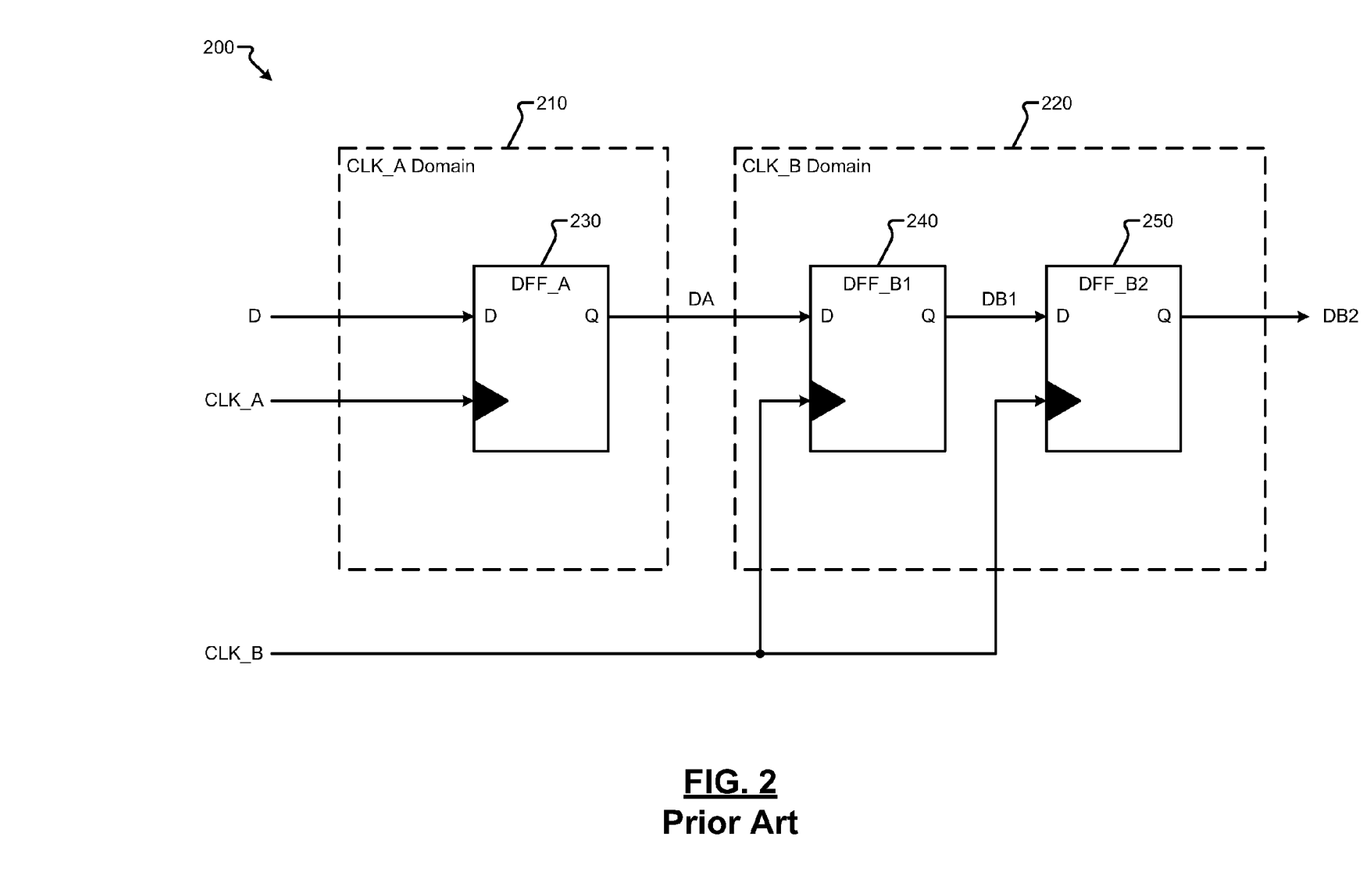
FIG. 2 is a schematic of an exemplary two D-flip-flop (2DFF) synchronizer.

Referring now to FIG. 2, a 2DFF synchronizer 200 is shown. A flip-flop DFF_A 230 is located in a CLK_A Domain 210. DFF_A 230 is not considered one of the two flip-flops of the 2DFF synchronizer 200. The 2DFF synchronizer 200 includes two other flip-flops, DFF_B1 240 and DFF_B2 250, which are located in CLK_B Domain 220. The CLK_B Domain 220 is of a different clock family than the CLK_A Domain 210.

When signal DA is propagated to DFF_B1 240 in the CLK_B Domain 220, DFF_B1 240 may enter a metastable state. If DFF_B1 240 does become metastable, there is a smaller probability that DFF_B2 250 will also become metastable because DFF_B2 250 is driven by DFF_B1 240. Thus, by allowing DFF_B2 250 (and not DFF_B1 240) to interact with the rest of the devices in CLK_B Domain 220 (i.e. devices after the 2DFF synchronizer 200), the probability that metastability will propagate may be reduced.

The single-bit 2DFF synchronizer 200 may reduce the probability that metastability will propagate, and thus may reduce the possibility of data corruption. However, the use of multiple single-bit synchronizers as a multiple-bit synchronization solution (i.e. a parallel synchronizer) may still lead to reconvergence violations. Reconvergence violations may occur when data signals driven by asynchronous clocks converge in subsequent logic. In other words, even though two data paths may be synchronized using single-bit synchronizers, the two synchronizers may output signals of different phases. The different phases may be due to variable and unpredictable delays caused by metastability. Reconvergence violations may be either combinational or sequential. Failure to correct reconvergence violations prior to silicon implementation may lead to functionality problems and possibly total chip failure.

One way to prevent reconvergence violations is to use a multiple-bit synchronizer where all of the outputs transition at the same time. For example, a MUX-based (DMUX) synchronizer may be used. A DMUX synchronizer is a multiple-bit synchronizer that combines 2DFF synchronization of control signals with MUX synchronization of data signals using the synchronized control signals.

Figure 3:
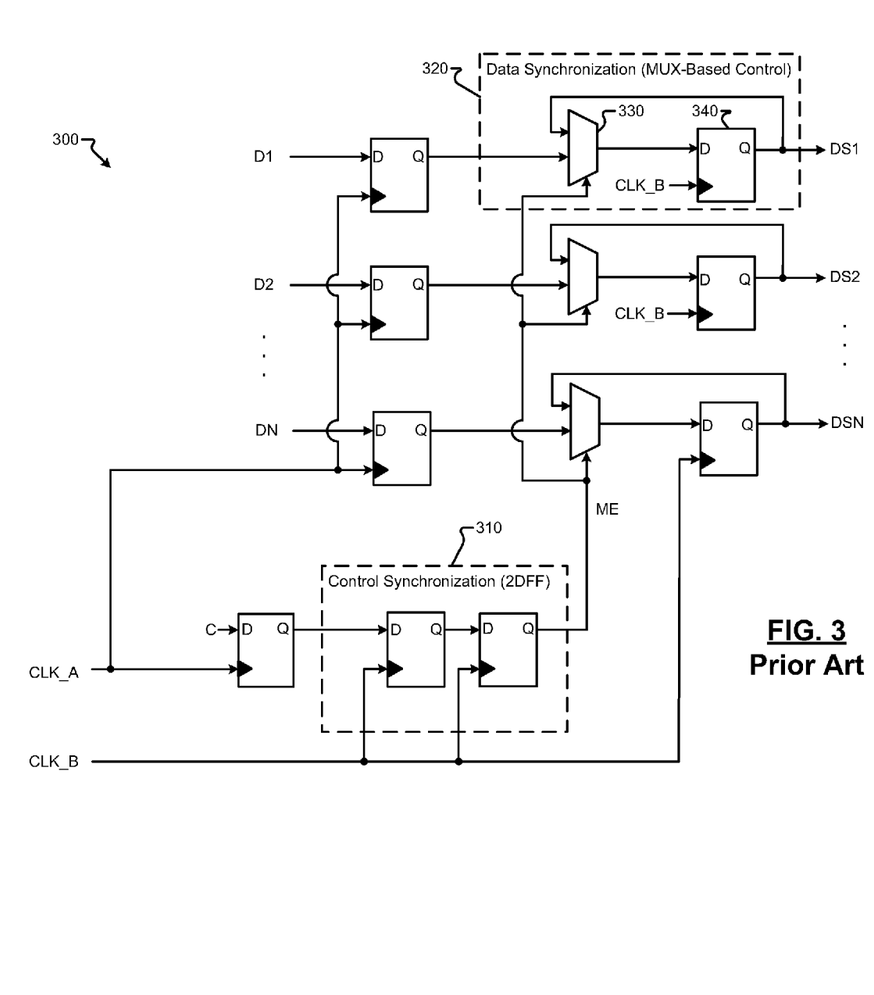
FIG. 3 is a schematic of an exemplary multiplexer (MUX) synchronization scheme (DMUX synchronizer)

Referring now to FIG. 3, a multiple-bit DMUX synchronizer 300 is shown. The DMUX synchronizer 300 may synchronize a data bus [D1:DN] transitioning from a CLK_A domain (i.e. a source domain) to a CLK_B domain (i.e. a destination domain). The data bus signals [D1:DN] and a synchronization control signal C are passed through D-flip-flops in the CLK_A domain. The control signal C is then passed through a single-bit 2DFF synchronizer 310 to synchronize it to the CLK_B domain. The output of the 2DFF synchronizer 310 is a synchronized control signal ME (i.e. synchronized to the CLK_B domain). The synchronized control signal ME may be used to control the MUXs in order to synchronize the data bus signals [D1:DN] to the CLK_B domain. Once the synchronized control signal ME goes high, the MUXs may pass stabilized data bus signals [D1:DN]. The stabilized data bus signals [D1:DN] are synchronized with the CLK_B domain when clocked through output D-flip-flops as synchronized data signals [DS1:DSN].

To illustrate the operation of a one-bit MUX-based synchronization, a MUX loop 320 is described. A MUX 330 drives a D-flip-flop 340 in the CLK_B domain and allows data bit D1 to pass from the CLK_A domain only when selected (i.e. when the MUX select signal, ME, is active). Otherwise, the MUX 330 re-circulates the D-flip-flop 340 output value, DS1. The functional check being performed here is that the source data signal D1 is stable when the MUX select signal ME goes high. Therefore, a reliable transition of bit D1 is made from the CLK_A domain to the CLK_B domain, and the bit D1 becomes synchronized with the CLK_B domain when it is clocked through the flip-flop 340.

Typical DMUX synchronizers may not tolerate synchronization where clock signals have an extreme frequency relationship (i.e. 10 to 1). In other words, the synchronized control signal ME may enable the MUXs before the input data bits [D1:DN] have stabilized at the MUX inputs, which may lead to logic errors that may propagate. Additionally, typical DMUX synchronizers are not able to tolerate synchronization where one clock signal may be extremely slow (or even stopped) at certain times. For example, a disk clock (i.e. DC_CLK) in a hard disk drive (HDD) may only be active during read/write operations. Lastly, typical DMUX synchronizers are not able to tolerate multiple synchronization requests (i.e. write sequences) during one synchronization cycle without loss of data, and thus a decrease in reliability.

SUMMARY

A system includes a data holding module that at least one of stores and receives data based on a first clock signal of a first clock domain, a data output module that receives the data from the data holding module and that selectively outputs the data based on a load signal and a second clock signal of a second clock domain which is asynchronous to the first clock domain, and a synchronization process module that generates the load signal based on a state of the data output module.

In other features, the state of the data output module includes at least one of setup, load, hold, and idle. The data holding module at least one of stores and receives the data based on a second load signal. The system includes a configuration data module that at least one of stores and receives the data and that outputs the data to the data holding module based on the first clock signal. The system includes a data loading module that selectively loads the configuration data module with the data based on a write signal and the first clock signal, and that determines a status of the configuration data module. The synchronization process module generates the second load signal based on the status of the configuration data module.

In other features, the system includes a load synchronization module that generates a status signal based on the status of the data output module. The synchronization process module generates a load pending signal based on the status signal. The data loading module loads the configuration data module based on the load pending signal. The data loading module determines a number of bytes of the data to be loaded, and loads the configuration data module with the determined number of bytes of the data.

A method includes at least one of storing and receiving data based on a first clock signal of a first clock domain, receiving the data at a data output module and selectively outputting the data from the data output module based on a load signal and a second clock signal of a second clock domain which is asynchronous to the first clock domain, and generating the load signal based on a state of the data output module.

In other features, the state of the data output module includes at least one of setup, load, hold, and idle. The method further includes at least one of storing and receiving the data at a data holding module based on a second load signal. The method further includes at least one of storing and receiving the data at a configuration data module, and outputting the data from the configuration data module to the data holding module based on the first clock signal. The method further includes selectively loading the data to the configuration data module based on a write signal and the first clock signal, and determining a status of the configuration data module.

In other features, the method further includes generating the second load signal based on the status of the configuration data module. The method further includes generating a status signal based on the status of the data output module. The method further includes generating a load pending signal based on the status signal. The method further includes loading the configuration data module based on the load pending signal. The method further includes determining a number of bytes of the data to be loaded, and loading the configuration data module with the determined number of bytes of the data.

A system includes data holding means for at least one of storing and receiving data based on a first clock signal of a first domain, data outputting means for receiving the data and selectively outputting the data based on a load signal and a second clock signal of a second clock domain which is asynchronous to the first clock domain, and synchronization process means for generating the load signal based on a state of the data outputting means.

In other features, the state of the data outputting means includes at least one of setup, load, hold, and idle. The data holding means at least one of stores and receives the data based on a second load signal. The system includes configuration data means for at least one of storing and receiving the data and outputting the data to the data holding means based on the first clock signal. The system includes data loading means for selectively loading the data to the configuration data means based on a write signal and the first clock signal, and for determining a status of the configuration data means.

In other features, the synchronization process means generate the second load signal based on the status of the configuration data means. The system includes load synchronization means for generating a status signal based on the status of the data outputting means. The synchronization process means generate a load pending signal based on the status signal. The data loading means load the configuration data means based on the load pending signal. The data loading means determine a number of bytes of the data to be loaded, and load the configuration data means with the determined number of bytes of the data.

A computer program stored on a computer-readable medium for use by a processor for operating a synchronization method includes at least one of storing and receiving data based on a first clock signal of a first clock domain, receiving the data at a data output module and selectively outputting the data from the data output module based on a load signal and a second clock signal of a second clock domain which is asynchronous to the first clock domain, and generating the load signal based on a state of the data output module.

In other features, the state of the data output module includes at least one of setup, load, hold, and idle. The computer program further includes at least one of storing and receiving the data at a data holding module based on a second load signal. The computer program further includes at least one of storing and receiving the data at a configuration data module, and outputting the data from the configuration data module to the data holding module based on the first clock signal. The computer program further includes selectively loading the data to the configuration data module based on a write signal and the first clock signal, and determining a status of the configuration data module.

In other features, the computer program further includes generating the second load signal based on the status of the configuration data module. The computer program further includes generating a status signal based on the status of the data output module. The computer program further includes generating a load pending signal based on the status signal. The computer program further includes loading the configuration data module based on the load pending signal. The computer program further includes determining a number of bytes of the data to be loaded, and loading the configuration data module with the determined number of bytes of the data.

In still other features, the systems and methods described above are implemented by a computer program executed by one or more processors. The computer program can reside on a computer readable medium such as but not limited to memory, non-volatile data storage and/or other suitable tangible storage mediums.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description is merely exemplary in nature and is in no way intended to limit the disclosure, its application, or uses. For purposes of clarity, the same reference numbers will be used in the drawings to identify similar elements. As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

Configuration registers store information that is used by various circuit components. For example, in hard disk drive (HDD) systems, configuration registers may store sector sizes and/or modes of operation (i.e. transfer direction, ECC mode, etc.). However, these various circuit components often operate according to asynchronous clock signals (i.e. in different clock domains). Thus, a solution is required to allow the configuration registers to be accessed by any asynchronous clock signals (i.e. across different clock domains), while still maintaining reliability and functionality.

Figure 4A:
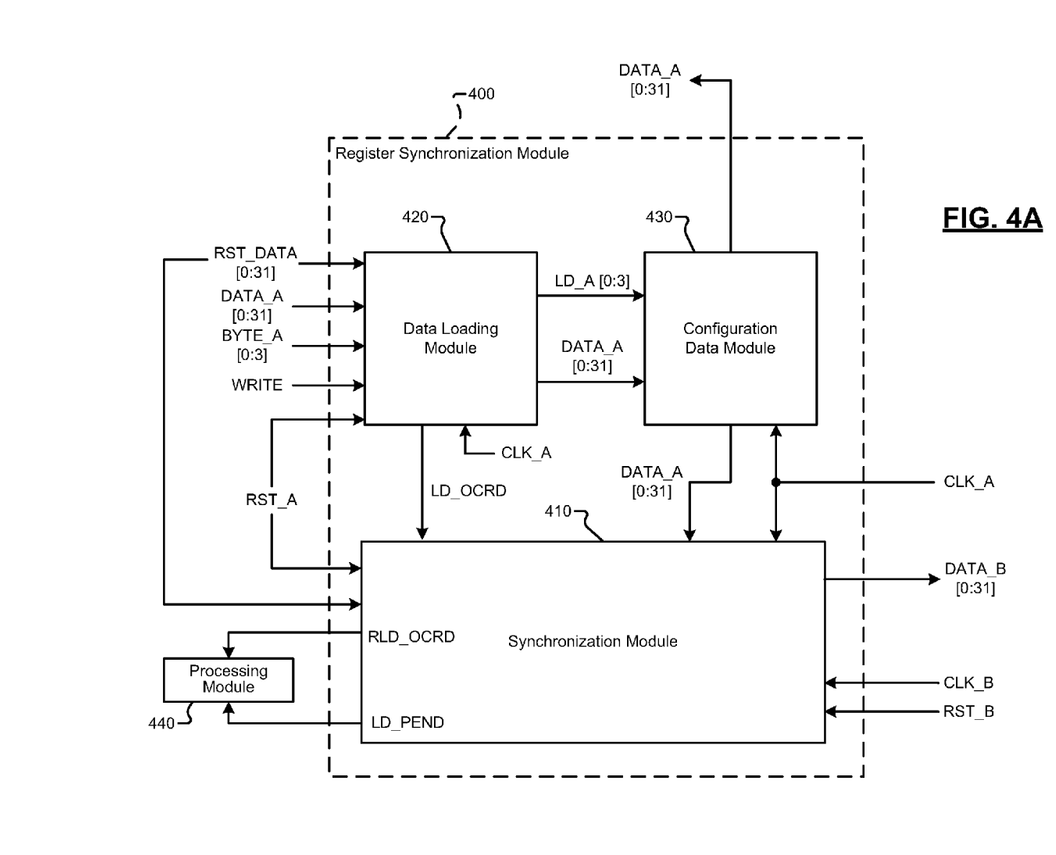
FIG. 4A is a functional block diagram of a register synchronization module according to the present disclosure.

Referring now to FIG. 4A, a register synchronization module 400 is shown. The register synchronization module 400 allows data in a configuration data module 430 to be accessed in both a CLK_A domain and a CLK_B domain. The register synchronization module 400 further includes a synchronization module 410, a data loading module 420, and the configuration data module 430.

The data loading module 420 loads data (i.e. DATA_A) into the configuration data module 430. The data loading module 420 receives a clock signal CLK_A (i.e. CLK_A Domain), a data bus signal DATA_A, a byte selection bus BYTE_A, a write strobe signal WRITE, a reset signal RST_A and a reset bus RST_DATA. While a 32-bit configuration register and 32-bit bus signals are shown, it can be appreciated that the configuration data module 430 may be a different type of memory and may be a different size (i.e. 16-bit, 64-bit, etc.). Similarly, it can be appreciated that while a 4-bit byte selection bus signal BYTE_A is shown that BYTE_A may be a different size depending on the size (i.e. the number of bytes) of the configuration data module 430.

The data loading module 420 may reset the configuration data module 430. A total reset of the configuration data module 430 may be performed (i.e. setting each bit to zero) by setting the reset signal RST_A high. Otherwise, a specific reset of the configuration data module 430 may be performed (i.e. setting each bit to a predetermined value) by using the reset bus signal RST_DATA. The reset bus signal RST_DATA may be a predetermined setting for the configuration data module 430. For example, the reset and/or reset bus signals may be generated by a processing module 440.

The data loading module 420 may load the configuration data module 430. A load may occur when a write strobe signal WRITE is high. The data loading module 420 may perform a total load of the configuration data module 430 (i.e. setting each bit to a new value) using the data bus signal DATA_A. Alternatively, byte selection bus signal BYTE_A may be used in connection with data bus signal DATA_A to load specific bits into the configuration data module 430 based on a bit map. For example, if BYTE_A[0] is high, the configuration data module 430 may load DATA_A[7:0]. For example, if BYTE_A[1] is high, the configuration data module 430 may load DATA_A[15:8]. For example, if BYTE_A[2] is high, the configuration data module 430 may load DATA_A[23:16]. For example, if BYTE_A[3] is high, the configuration data module 430 may load DATA_A[31:24]. The write strobe signal WRITE and/or the byte selection bus signal BYTE_A may be generated by the processing module 440.

Once a successful load operation has completed, the data loading module 420 may generate a LD_OCRD signal. The LD_OCRD signal may be communicated to the synchronization module 410. The LD_OCRD signal may notify the synchronization module 410 that a load of the configuration data module 430 occurred and that a synchronization process may begin. The synchronization module 410 communicates with the data loading module 420, the configuration data module 430, and the processing module 440. For example, the synchronization module 410 may communicate with the processing module 440 using status signals LD_PEND and RLD_OCRD.

The synchronization module 410 further receives clock signals CLK_A and CLK_B, reset signals RST_A and RST_B, reset bus signal RST_DATA, and data bus signal DATA_A. The synchronization module 410 may synchronize data stored in the configuration data module 430 (DATA_A) to the CLK_B Domain, thus generating synchronized data bus signal DATA_B. The synchronized data bus signal DATA_B allows other circuits/components (with asynchronous clocks) to read the data stored in the configuration data module 430 (DATA_A).

Reset signal RST_A may be used to notify the synchronization module 410 that a reset of the configuration data module 430 has occurred, and any current synchronization cycle may be abandoned. Reset signal RST_B may be used to perform a total reset of the synchronized data bus signal DATA_B (set each bit to zero). Reset bus signal RST_DATA may be used to perform a specific reset of the synchronized data bus signal DATA_B (i.e. set each bit to a specific value) to the predetermined configuration. In other words, reset bus signal RST_DATA may reset data bus signal DATA_B the same way as a specific reset of data bus signal DATA_A.

The data loading module 420 may wait to receive confirmation from the processing module 440 that a new load operation may begin. For example, the processing module 440 may wait for status signal LD_PEND to go low before generating the write strobe signal WRITE. The processing module 440 may do this in order to prevent multiple load requests from occurring during a single synchronization cycle.

By preventing multiple load requests from occurring, the processing module 440 may prevent the loss of one or more load operations, and thus possibly prevent the loss of important data. A loss of a load operation and possibly a loss of data may occur because load requests prior to a most recent load operation may not be performed. Multiple load requests may occur during a synchronization cycle because CLK_B may be off, and thus the synchronization cycle cannot complete until it is on again. For example, if CLK_B is the disk clock (DC_CLK) of an HDD system, the DC_CLK may be off when read/write operations are not occurring.

If the processing module 440 does not wait for status signal LD_PEND, another load may still be performed (a reload) without corrupting the current synchronization cycle. The synchronization module 410 includes a data holding module (not shown) that holds the data from the configuration data module 430 before synchronization actually occurs. Thus, the data loading module 420 may execute another load operation of the configuration data module 430 without corrupting the data that is currently being synchronized.

If the data loading module 420 executes another load operation, the synchronization module 410 will receive another LD_OCRD signal. However, if the synchronization module 410 receives a LD_OCRD signal while LD_PEND is high (i.e. a synchronization cycle is occurring), the synchronization module 410 may set status signal RLD_OCRD to high. The status signal RLD_OCRD may be notify the processing module 440 that a reload has occurred and the data may be synchronized during the next synchronization cycle. However, a loss of a load operation and possibly a loss of data may occur because load requests prior to the most recent load operation may not be performed. Thus, the processing module 440 may use the status signal LD_PEND to prevent possible data loss by preventing multiple load requests.

Figure 4B:
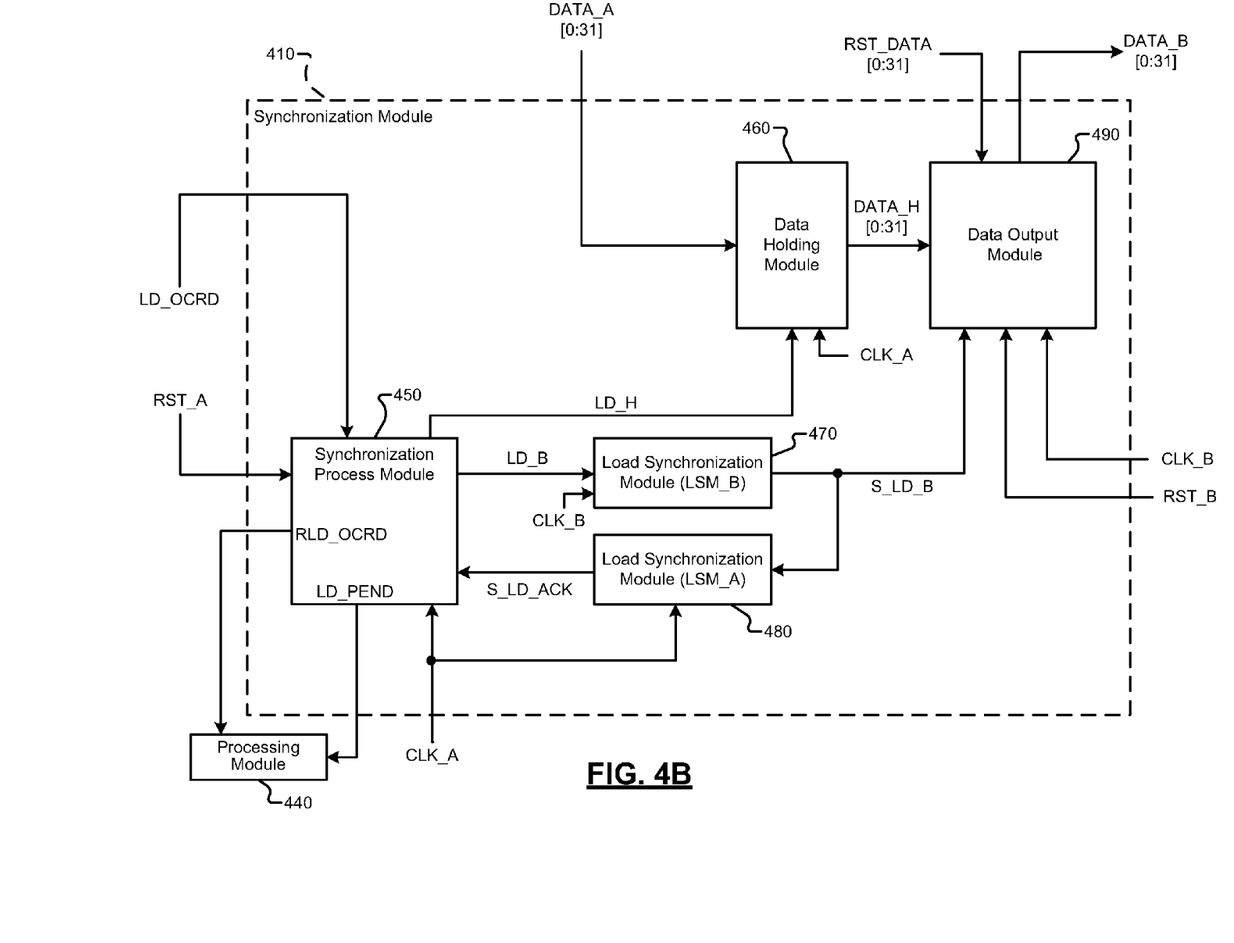
FIG. 4B is a functional block diagram of a synchronization module according to the present disclosure.

Referring now to FIGS. 4A and 4B, the synchronization module 410 is shown in more detail. The synchronization module 410 may include a synchronization process module

450, a data holding module 460, two load synchronization modules LSM_A and LSM_B 470, 480, and a data output module 490.

The synchronization process module 450 coordinates access of the configuration data module 430 by other circuits/components in a CLK_B Domain (i.e. asynchronous clocks). For example, the synchronization process module 450 may synchronize data in the configuration data module 430 (DATA_A) to the CLK_B Domain. A synchronization process may begin when the synchronization process module 450 receives signal LD_OCRD from the data loading module 420.

During the synchronization process, the synchronization process module 450 may set status signal LD_PEND to high until the synchronization process has completed. Status signal LD_PEND may be used by the processing module 440 to prevent multiple load requests during the synchronization cycle so that data loss may be prevented. The synchronization process module 450 may load the data holding module 460 with the data (DATA_A) from the configuration data module 430. The load command may be controlled by load signal LD_H.

The synchronization process module 450 may also begin a handshake process by sending a low load signal LD_B through load synchronization module LSM_B 470 (i.e. a 2DFF synchronizer). For example, the load synchronization module LSM_B 470 may synchronize low load signal LD_B to the CLK_B Domain. The low synchronized load signal S_LD_B may be received by the other load synchronization module LSM_A 480 (i.e. a 2DFF synchronizer). The low synchronized load signal S_LD_B may be synchronized back to the CLK_A domain through load synchronization module LSM_A 480 as low load acknowledgment signal S_LD_ACK. Low load acknowledgment signal S_LD_ACK may be received by the synchronization process module 450. For example, the synchronization process module 450 may wait for S_LD_ACK to go low before sending out a high load signal LD_B in order to allow the output of the data holding module 460 (DATA_H) to stabilize.

The synchronization process module 450 may send a high load signal LD_B after receiving the low load acknowledgement signal S_LD_ACK. In other words, the data waiting at the input of the data output module 490 (DATA_H) should be stable once S_LD_ACK goes low. The high load signal LD_B may be synchronized to the CLK_B domain through load synchronization module LSM_B 470. The high synchronized load signal S_LD_B may be received by the data output module 490 and the other load synchronization module LSM_A 480.

The data output module 490 may be loaded from the data holding module 460 (DATA_H). Therefore, the data output module 490 may contain synchronized data from the configuration data module 430. In other words, data from the configuration data module 430 (DATA_A) may now be available in the CLK_B Domain as synchronized data bus signal DATA_B.

Similar to the configuration data module 430, the data output module 490 may also be reset. The data output module 490 may be totally reset (i.e. setting each bit to zero) using reset signal RST_B. The data output module 490 may also be specifically reset using the same reset bus signal, RST_DATA.

As mentioned previously, the high synchronized load signal S_LD_B may also be received by the other load synchronization module LSM_A 480. The load synchronization module LSM_A 480 may synchronize the high synchronized load signal S_LD_B back into the CLK_A Domain as high load acknowledgment signal S_LD_ACK. The synchronization process module 450 may receive the high load acknowledgment signal S_LD_ACK.

The synchronization process module 450 may send another low load signal LD_B after receiving high load acknowledgment signal S_LD_ACK. The low load signal LD_B may be sent through the load synchronization modules LSM_B 470 and LSM_A 480 and returned to the synchronization process module 450 as a low acknowledgment signal S_LD_ACK. For example, receiving the second low S_LD_ACK signal completes the low-high-low handshake process. In other words, waiting for S_LD_ACK to go low a second time may prevent the output of the data holding module 460 (DATA_H) from changing before the load of the data output module 490 has completed. Once this handshake process is complete (S_LD_ACK transitioned low-high-low), the synchronization cycle has completed. The synchronization process module 450 may then set status signal LD_PEND to low, notifying the processing module 440 that another synchronization cycle may begin.

Figure 5:
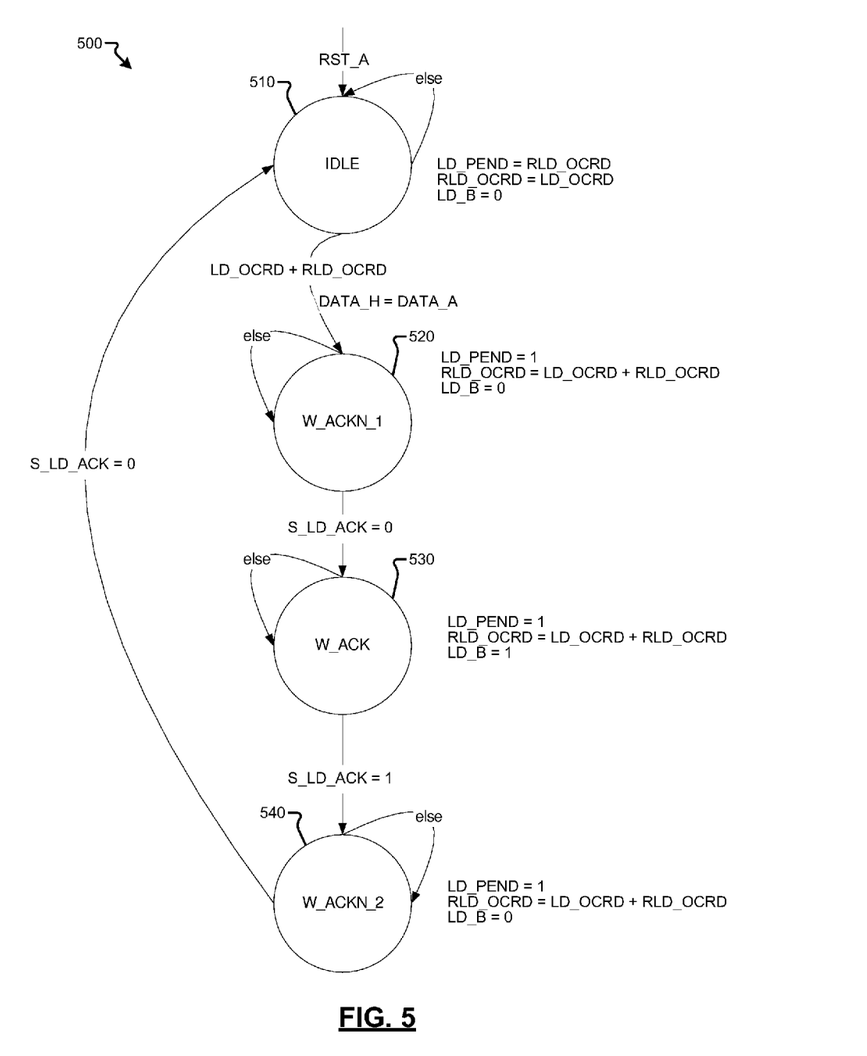
FIG. 5 is a state machine diagram corresponding to the register synchronization module according to the present disclosure.

Referring now to FIG. 5, a state diagram 500 illustrating the operation of the register synchronization module 400 is shown. The process begins in state 510 where the register synchronization module 400 is idle. The register synchronization module 400 may be in the idle state 510 if a reset occurs (i.e. RST_A=1). The register synchronization module 400 may also be in the idle state 510 if a load is not pending (i.e. LD_PEND=0). The register synchronization module 400 may also be in the idle state 510 if a load operation was successfully completed (i.e. S_LD_ACK transitioned from low-high-low, completing the handshake process).

The synchronization process module 450 may generate a LD_OCRD signal based on the RLC_OCRD flag. In other words, if a reload operation occurred during the previous synchronization cycle, then a new synchronization cycle may begin for that loaded data.

Once a load operation is triggered (i.e. LD_OCRD=1), the register synchronization module 400 may move to state 520. In state 520 the data holding module 460 may be loaded from the configuration data module 430 (DATA_A) using load signal LD_H. The synchronization process module 450 may trigger the RLD_OCRD flag (notifying the processing module 440) if another LD_OCRD signal is received because a reload operation occurred. The register synchronization module 400 may remain in state 520 until the low load signal LD_B propagates through LSM_B 470 and LSM_A 480 and is received as a low load acknowledgment signal S_LD_ACK.

In state 530 (once S_LD_ACK=0) the data output module 490 may be loaded from the data holding module 460 (DATA_H). The synchronization process module 450 may send a high load signal LD_B, which may be synchronized to the CLK_B domain through load synchronization module LSM_B 470. The data output module 490 may be loaded when it receives high synchronized load signal S_LD_B from the load synchronization module LSM_B 470.

The synchronization process module 450 may trigger the RLD_OCRD flag (notifying the processing module 440) if another LD_OCRD signal is received because a reload operation occurred. Synchronized high load signal S_LD_B may also be synchronized back to the CLK_A domain as high load acknowledgment signal S_LD_ACK, which may be received by the synchronization process module 450.

In state 540 (once S_LD_ACK=1), the synchronization process module 450 may send another low load signal LD_B through load synchronization modules LSM_A 470 and LSM_B 480. The synchronization process module 450 may trigger the RLD_OCRD flag (notifying the processing module 440) if another LD_OCRD signal is received (i.e. a reload operation occurred). The synchronization process module 450 may wait to receive low load acknowledgment signal S_LD_ACK in order to complete the handshake process. The synchronization process module 450 may then set the LD_PEND signal to low, and the register synchronization module 400 may return to state 510 where another synchronization cycle may be performed.

Figure 6:
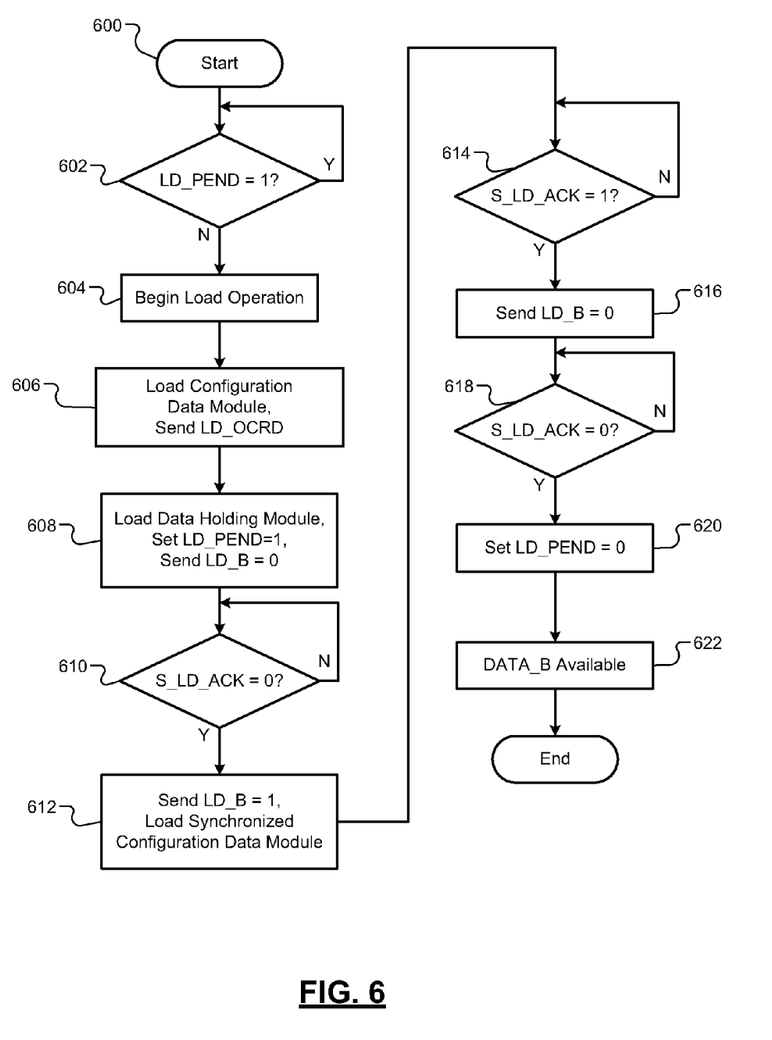
FIG. 6 is a flow diagram illustrating steps performed by the register synchronization module according to the present disclosure.

Referring now to FIG. 6, a flow diagram illustrating steps performed by the processing module 440 and the register synchronization module 400 during one synchronization cycle begins in step 600. In step 602, the processing module 440 determines whether status signal LD_PEND is high. If yes, control returns to step 602. If no, control proceeds to step 604. In step 604, the processing module 440 commands the register synchronization module 400 to begin a load operation. In step 606, the data loading module 420 loads the data configuration module 430, and sends status signal LD_OCRD to the synchronization module 410.

In step 608, the synchronization process module 450 loads the data holding module 460 with data from the configuration data module 430 (DATA_A). The synchronization process module 450 also sets the status signal LD_PEND to high to notify the processing module 440 to stop multiple load requests from occurring during the synchronization cycle. In step 610, the synchronization process module 450 sets load signal LD_B to low and waits to receive a low acknowledgment signal S_LD_ACK before proceeding to step 612.

In step 612, the synchronization process module 450 sends a high load signal LD_B to synchronize DATA_A to the CLK_B domain by loading the data output module 490. In step 614, the synchronization process module 450 waits to receive a high acknowledgment signal S_LD_ACK before proceeding to step 616.

In step 616, the synchronization process module 450 sends another low load signal LD_B. In step 618, the synchronization process module 450 waits to receive a low acknowledgment signal S_LD_ACK before proceeding to step 620. In step 620, the synchronization process module 450 sets status signal LD_PEND to low, notifying the processing module 440 that another synchronization cycle may begin. In step 622, data bus signal DATA_A may now be reliably accessed in the CLK_B domain as data bus signal DATA_B, and control ends.

Figure 7:
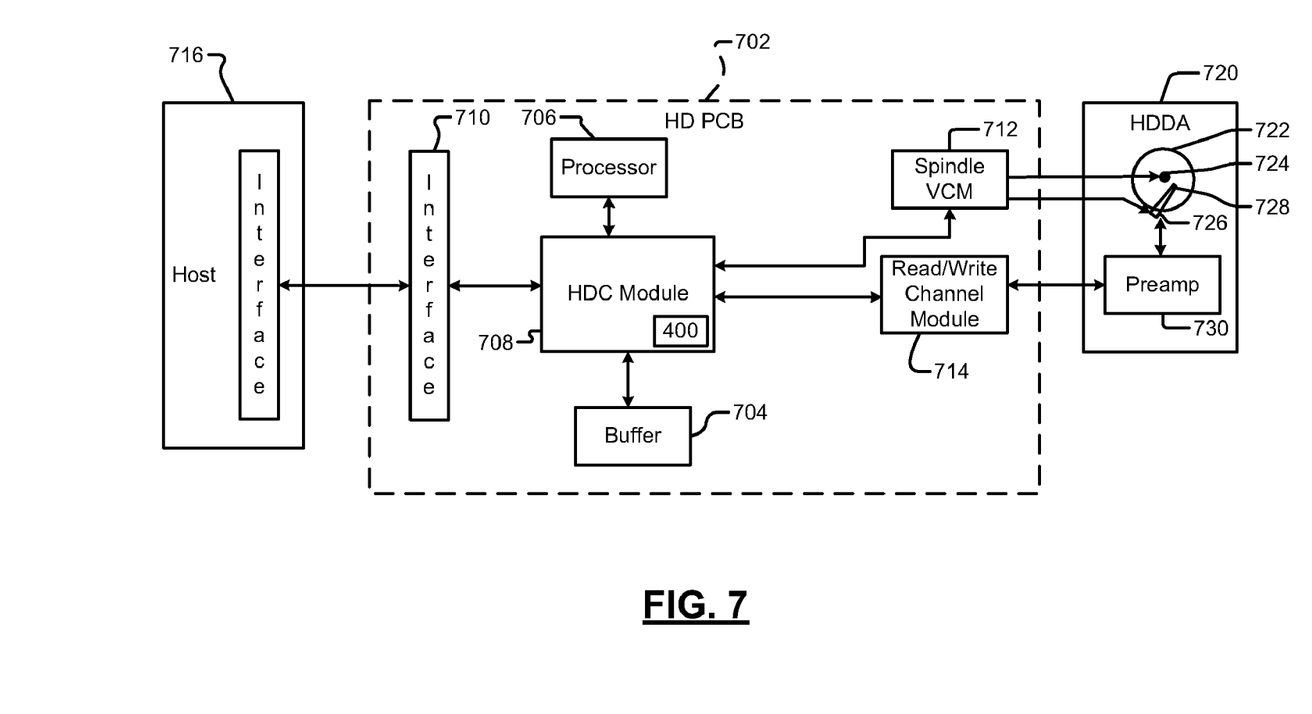
FIG. 7 is a functional block diagram of an exemplary hard disk drive (HDD) system according to the present disclosure.

Referring now to FIG. 7, an exemplary hard disk drive (HDD) system 700 that may implement the register synchronization module 400 of the present disclosure is shown to include an HDD printed circuit board (PCB) 702. A memory module such as buffer 704 stores read, write and/or volatile control data that is associated the control of the HDD system 700. The buffer 704 usually employs volatile memory having low latency. For example, SDRAM, double data rate (DDR), or other types of low latency memory may be used. Nonvolatile memory such as flash memory may also be provided to store critical data such as nonvolatile control code.

A processor 706 arranged on the HDD PCB 702 performs data and/or control processing that is related to the operation of the HDD system 700. For example, the processor 706 may perform the same functions as the processing module 440 (see FIGS. 4A and 4B). A hard disk control (HDC) module 708 communicates with an input/output interface 710, with a spindle/voice coil motor (VCM) driver or module 712, and/or a read/write channel module 714. The HDC module 708 coordinates control of the spindle/VCM module 712, the read/write channel module 714, and the processor 706 and data input/output with a host 716 via the interface 710.

The HDC module 708 may further include the register synchronization module 400 of the present disclosure. The register synchronization module 400 may include configuration registers that store important data, such sector sizes and/or modes of operation (i.e. transfer direction, ECC correction mode, etc.). The register synchronization module 400 may allow circuits/components in different clock domains (i.e. asynchronous clock signals) to access the data stored in the configuration registers.

A hard disk drive assembly (HDDA) 720 includes one or more hard drive platters 722 that include magnetic coatings that store magnetic fields. The platters 722 are rotated by a spindle motor that is schematically shown at 724. Generally the spindle motor 724 rotates the hard drive platter 722 at a controlled speed during the read/write operations. One or more read/write arms 726 move relative to the platters 722 to read and/or write data to/from the hard drive platters 722. The spindle/VCM module 712 controls the spindle motor 724, which rotates the platter 722. The spindle/VCM module 712 also generates control signals that position the read/write arm 726, for example using a voice coil actuator, a stepper motor or any other suitable actuator.

During write operations, the read/write channel module 714 encodes the data to be written with a read/write device 728. The read/write channel module 714 processes the write signal for reliability and may apply, for example, error correction coding (ECC), run length limited coding (RLL), and the like. During read operations, the read/write channel module 714 converts an analog read signal output of the read/write device 728 to a digital read signal. The converted signal is then detected and decoded by known techniques to recover the data that was written on the platters 722.

The read/write device 728 is located near a distal end of the read/write arm 726. The read/write device 728 includes a write element such as an inductor that generates a magnetic field. The read/write device 728 also includes a read element (such as a magneto-resistive (MR) element) that senses the magnetic field on the platter 722. The HDDA 720 includes a preamplifier circuit or module 730 that amplifies the analog read/write signals. When reading data, the preamplifier module 730 amplifies low level signals from the read element and outputs the amplified signal to the read/write channel module 714. While writing data, a write current is generated that flows through the write element of the read/write device 728. The write current is switched to produce a magnetic field having a positive or negative polarity. The positive or negative polarity is stored by the hard drive platter 722 and is used to represent data.

The data is stored on the platters 722 in sectors. Each sector is byte structured and includes various fields according to a sector format. Typically, a sector format includes a logical block address (LBA) field followed by a data field, a cyclic redundancy check (CRC) checksum field, and/or an ECC field. For example, the LBA field may include 4 bytes data, the data field may include 512 bytes of data, the CRC checksum field may include 4 bytes of data, and the ECC field may include 40-80 bytes of data. The LBA includes position information such as cylinder, head, and/or sector numbers.

Portions of the HDD system 700 may be implemented by one or more integrated circuits (IC) or chips. For example, the processor 706 and the HDC module 708 may be implemented by a single chip. The spindle/VCM module 712 and/or the read/write channel module 714 may also be implemented by the same chip as the processor 706, the HDC module 708 and/or by additional chips. Alternatively, most of the HDD system 700 other than the HDDA 720 may be implemented as a system-on-a-chip (SOC).

Figure 8:
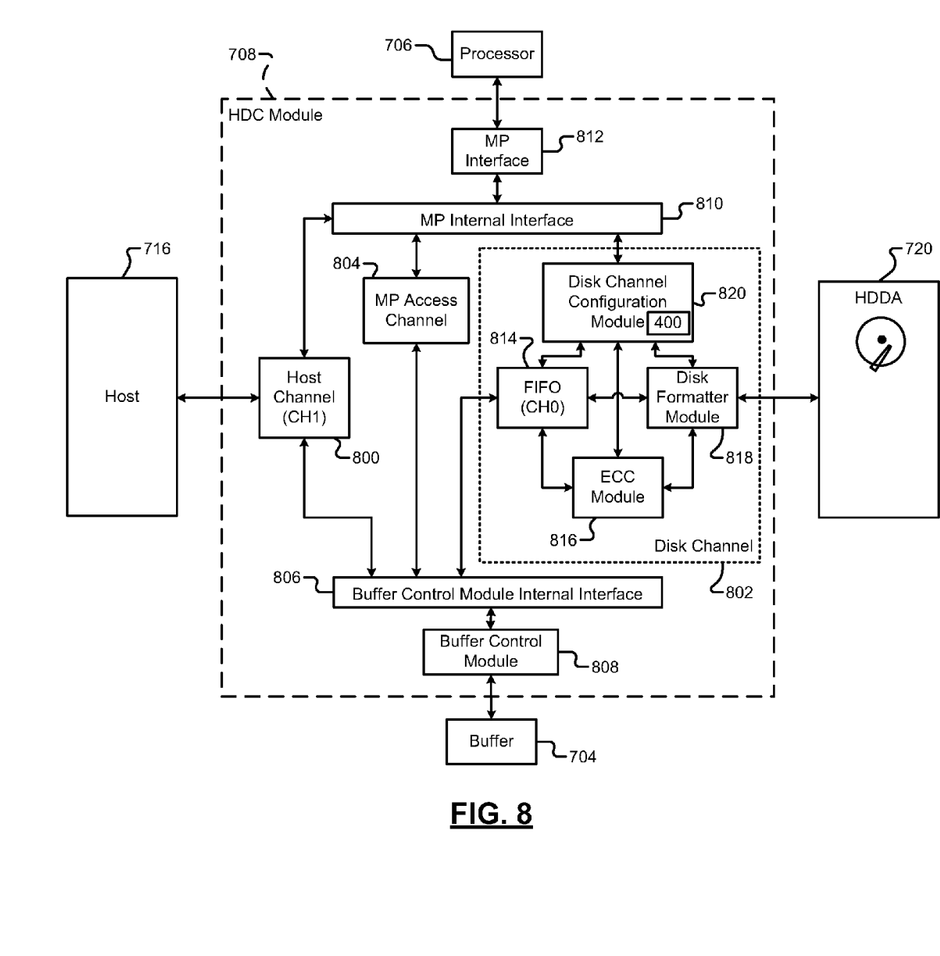
FIG. 8 is a functional block diagram of an exemplary hard disk control (HDC) module according to the present disclosure.

Referring now to FIG. 8, the HDC module 708 that may implement the register synchronization module 400 of the present disclosure is shown. The HDC module 708 communicates with the buffer 704, the processor 706, the host 716, and the HDDA 720 as described in FIG. 7. The HDC module 708 includes a host channel (CH1) 800, a disk channel 802, a microprocessor (MP) access channel 804, a buffer control module 808, a buffer control module internal interface 806, and internal and external MP interfaces 810, 812.

The disk channel 802 further includes a FIFO (CH0) 814, an error correction coding (ECC) module 816, a disk formatter module 818, and a disk channel configuration module 820. The disk channel 802 communicates with the HDDA 720, the MP internal interface 806, and the buffer control module internal interface 812. The disk channel configuration module 820 may further include the register synchronization module 400.

The buffer control module 808 may include a dynamic random access memory (DRAM) controller, or DRC. The buffer control module 808 connects the buffer 704 to the disk formatter module 818, the ECC module 816, the host 716, the processor 706 (through the MP access channel 804), and the HDDA 720. The buffer control module 808 regulates data movement in and out of the buffer 704.

The host 716 sends read and write commands to the HDC module 708. The HDC module 708 stores the read and write commands in the buffer 704. The processor 706 receives the read and write commands from the buffer 704 and executes firmware to control the HDC module 708 accordingly.

During read operations, the HDC module 708 reads data corresponding to the read commands from the HDDA 720. The buffer control module 808 and the ECC module 816 receive the data from the HDDA 720. The ECC module 816 provides an ECC mask for errors that may have occurred during read operations while the data is still in the buffer control module 808. After errors in the data are corrected, the data is transferred to the buffer 704. The data is then transferred from the buffer 704 to the host 716.

During write operations, the disk formatter module 818 controls writing of data to the HDDA 720. The buffer 704 receives data corresponding to the write commands via the HDC module 708. The disk formatter module 818 receives the data from the buffer 704 via the HDC module 708. The disk formatter module 818 formats the data for writing to the HDDA 720. For example, the disk formatter module 818 adds error correction codes to the data, monitors a position of the read/write heads, and writes the data to the read/write heads as described in FIG. 7.

The FIFO (CH0) 814 may be used to buffer communication between the buffer control module 808 and the other components of the disk channel 802. For example, data may be temporarily stored in the FIFO (CH0) 814 because the buffer control module 808 and the other components of the disk channel 802 are operating at different speeds.

Figure 9:
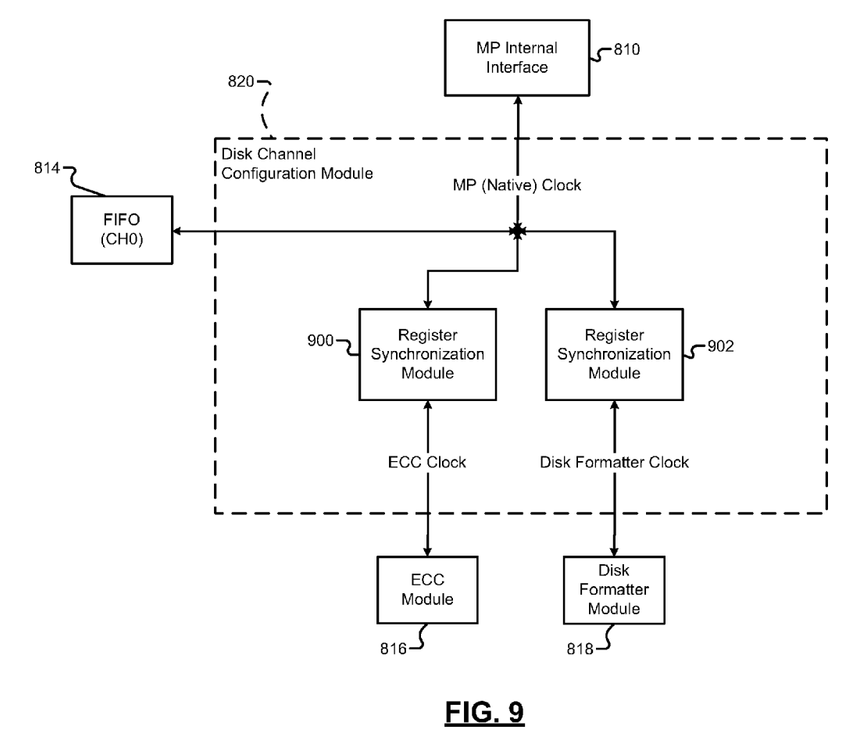
FIG. 9 is a functional block diagram of an exemplary disk channel configuration module according to the present disclosure.

Referring now to FIG. 9, the disk channel configuration module 820 is shown. The disk channel configuration module 820 communicates with the internal MP internal interface 810, the FIFO (CH0) 814, the ECC module 816, and the disk formatter module 818. The disk channel configuration module 820 may include two register synchronization modules 900, 902. For purposes of simplicity, we will now refer to one register synchronization module 900.

The register synchronization module 900 may include one or more configuration registers. For example, the register synchronization module 900 may include a 32-bit configuration register. The configuration registers may store important information, such as sector sizes and modes of operation (i.e. transfer direction, ECC correction, etc.). The register synchronization module 900 may connect two asynchronous clock domains. For example, the register synchronization module 900 may connect the ECC module 816 (i.e. ECC clock, a version of the disk clock) and the MP internal interface 810 (i.e. MP clock, or native clock). The register synchronization module 900 may allow the asynchronous components connected to it to access the configuration data.

The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A system, comprising:
a data holding module configured to store or receive data based on a first clock signal of a first clock domain;
a data output module configured to i) receive the data from the data holding module, and ii) selectively output the data based on i) a load signal, and ii) a second clock signal of a second clock domain which is asynchronous to the first clock domain; and
a synchronization process module configured to, in response to receiving a status signal, generate the load signal based on a state of the data output module and, wherein the status signal indicates that a synchronization cycle of the data output module is complete.

2. The system of claim 1, wherein the state of the data output module includes at least one of setup, load, hold, and idle.

3. The system of claim 2, wherein the data holding module is configured to store or receive the data based on a second load signal.

4. The system of claim 3, further comprising:
a configuration data module configured to i) store or receive the data, and ii) output the data to the data holding module based on the first clock signal.

5. The system of claim 4, further comprising:
a data loading module configured to i) selectively load the configuration data module with the data based on (i) a write signal and (ii) the first clock signal, and (ii) determine a status of the configuration data module.

6. The system of claim 5, wherein the synchronization process module is configured to generate the second load signal based on the status of the configuration data module.

7. The system of claim 6, further comprising:
a load synchronization module configured to generate the status signal based on the status of the data output module.

8. The system of claim 7, wherein the synchronization process module is configured to generate a load pending signal based on the status signal.

9. The system of claim 8, wherein the data loading module is configured to load the configuration data module based on the load pending signal.

10. The system of claim 9, wherein the data loading module is configured to i) determine a number of bytes of the data to be loaded, and ii) load the configuration data module with the determined number of bytes of the data.

11. A method, comprising:
storing or receiving data based on a first clock signal of a first clock domain; and receiving the data at a data output module, and selectively outputting the data from the data output module based on i) a load signal, and ii) a second clock signal of a second clock domain which is asynchronous to the first clock domain, wherein the load signal is generated based on a state of the data output module and in response to receiving a status signal, wherein the status signal indicates that a synchronization cycle of the data output module is complete.

12. The method of claim 11, wherein the state of the data output module includes at least one of setup, load, hold, and idle.

13. The method of claim 12, further comprising:
storing or receiving the data at a data holding module based on a second load signal.

14. The method of claim 13, further comprising:
storing or receiving the data at a configuration data module; and
outputting the data to the data holding module based on the first clock signal.

15. The method of claim 14, further comprising:
selectively loading the data to the configuration data module based on a write signal and the first clock signal; and
determining a status of the configuration data module.

16. The method of claim 15, further comprising:
generating the second load signal based on the status of the configuration data module.

17. The method of claim 16, further comprising:
generating the status signal based on the status of the data output module.

18. The method of claim 17, further comprising:
generating a load pending signal based on the status signal.

19. The method of claim 18, further comprising:
loading the configuration data module based on the load pending signal.

20. The method of claim 19, further comprising:
determining a number of bytes of the data to be loaded; and
loading the configuration data module with the determined number of bytes of the data.

* * * * *